United States Patent
Hopson et al.

[11] Patent Number: 6,042,479
[45] Date of Patent: Mar. 28, 2000

[54] CONSTANT VELOCITY JOINT RETAINER

[75] Inventors: Michael Walter Hopson; Daniel J. Schmidt, both of Clinton Township; Richard Seidel, Macomb Township, all of Mich.

[73] Assignee: Ford Global Technologies, Inc.,, Dearborn, Mich.

[21] Appl. No.: 09/089,680

[22] Filed: Jun. 3, 1998

[51] Int. Cl.[7] .................................................. F16D 3/16
[52] U.S. Cl. ..................... 464/145; 464/906; 464/145; 464/140
[58] Field of Search .................... 464/906, 139, 464/145, 143, 190

[56] References Cited

U.S. PATENT DOCUMENTS

| | | | |
|---|---|---|---|
| 2,441,052 | 5/1948 | Wilmer | 464/143 |
| 3,815,381 | 6/1974 | Wagner . | |
| 4,020,648 | 5/1977 | Krude . | |
| 4,832,657 | 5/1989 | Hahn | 464/906 |
| 5,433,668 | 7/1995 | Harz et al. . | |
| 5,451,185 | 9/1995 | Krude et al. . | |
| 5,704,838 | 1/1998 | Teale | 464/906 |
| 5,947,826 | 9/1999 | Sequin | 464/906 |

FOREIGN PATENT DOCUMENTS

| | | |
|---|---|---|
| 4228482A1 | 8/1993 | Germany . |
| 4228482C2 | 8/1993 | Germany . |
| 4303901A1 | 10/1993 | Germany . |
| 4217322C1 | 12/1993 | Germany . |
| 4211170C2 | 3/1994 | Germany . |
| 4327990C1 | 8/1995 | Germany . |
| 2127132 | 4/1984 | United Kingdom . |
| WO93/16296 | 8/1993 | WIPO . |

*Primary Examiner*—Eric K. Nicholson
*Assistant Examiner*—Kenneth Thompson
*Attorney, Agent, or Firm*—James J. Dottavio

[57] ABSTRACT

A retaining ring and method of installation are provided to maintain the relative position of an inner joint to an outer joint in a constant velocity joint. The outer joint has an open end, a generally spherical internal surface with a plurality of ball grooves, and an annular groove formed in the internal surface near the open end of the outer joint. An annular ring with a radially extending tab is aligned within one of the ball grooves to axially align the tab with the annular groove. The annular ring is then rotatable within the annular groove to align the tab between two of the ball grooves. The annular ring is rotationally retained within the annular groove.

8 Claims, 2 Drawing Sheets

CONSTANT VELOCITY JOINT RETAINER

FIELD OF THE INVENTION

The present invention relates to an undercut-free constant velocity joint retainer and a method of assembling such a constant velocity joint.

BACKGROUND OF THE INVENTION

German patent DE 43 27 990 C1 (German '990) describes a fixed constant velocity joint having a retainer ring 8 to retain an inner race to an outer race. In the '990 patent, the retainer 8 is retained by reshaping the open end, as illustrated in a first embodiment in FIG. 1 at 12. In FIG. 1 of German '990, end is upset using an axial force to form a bumper stop 12 to axially retain the ring 8. Likewise, in FIG. 2 of German '990, the open end is upset at 13 to create discrete stops (notches) to retain the ring 8.

In FIG. 3 of German '990, the ring 8 has radially outwardly projecting tabs 15 which engage radial slots in the open end of the outer joint. The slots are upset at 14 to axially retain the ring 8, as illustrated best in FIG. 3A of German '990.

In FIG. 4 of German '990, the outer joint has an annular groove 18. As illustrated in FIG. 4a of German '990, the ring is then upset at 19 to form a stop to retain the ring 18. German '990 patent thus requires the formation of some sort of a flange at the open end of the bell joint and the insertion of the cage retainer into the groove, then an axial upsetting operation on the bell joint to axially deform the joint to retain the ring. These operations are expensive, difficult, and may not provide precise axial location nor adequate retention of the joint.

It would therefore be desirable to provide an improved retainer to axially retain the inner joint to the outer joint in a more secure manner, more precisely, and at low cost.

SUMMARY OF THE INVENTION

It is thus an object to provide an improved constant velocity joint having a retention ring which is easily and inexpensively manufactured and assembled.

Accordingly, a retaining ring and installation method therefor are provided to maintain the relative position of an inner joint to an outer joint in a constant velocity joint. The outer joint has an open end, a generally spherical internal surface with a plurality of ball grooves, and an annular groove formed in the internal surface near the open end of the outer joint. An annular ring with a radially extending tab is aligned within one of the ball grooves to axially align the tab with the annular groove. The annular ring is then rotatable within the annular groove to align the tab between two of the ball grooves. The annular ring is rotationally retained within the annular groove.

DETAILED DESCRIPTION OF PREFERRED EMBODIMENTS

Figure 1:
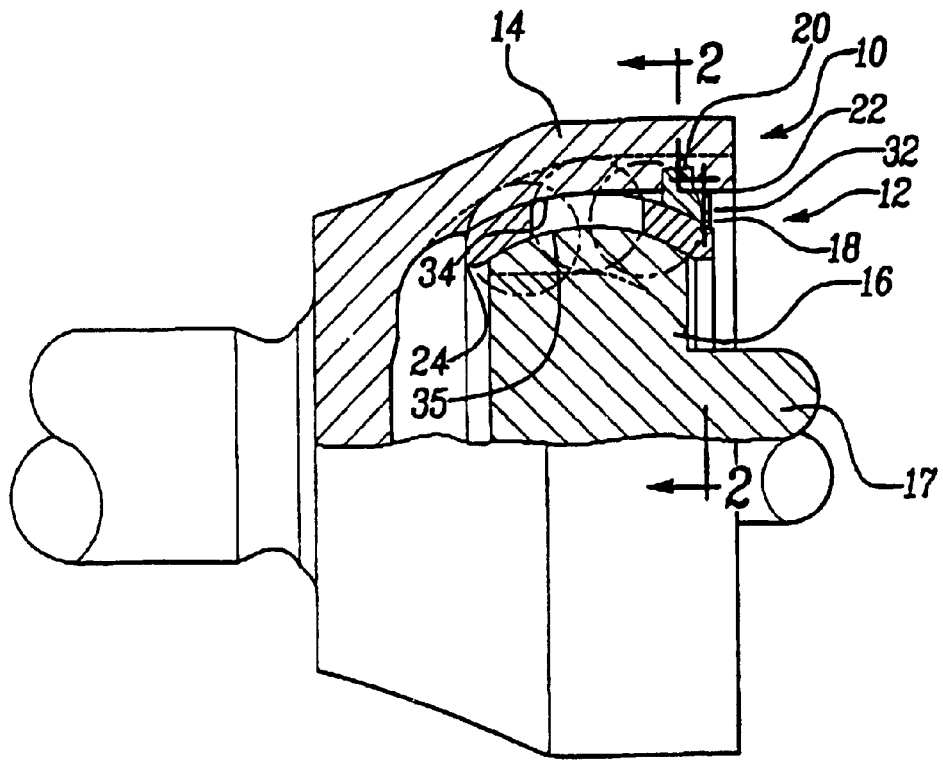
FIG. 1 is a partial cross sectional view of a constant velocity joint according to the present invention.

A constant velocity joint 10 includes an outer race 14 and an inner race 16. The outer race 14 includes a plurality of circumferentially formed ball track surfaces, or race grooves 30 formed on the inner periphery thereof. The races extend in a generally axial direction.

The inner race 16 includes a plurality of ball grooves 26 corresponding with the outer ball grooves 30 formed therein. A plurality of balls 28 are provided within the grooves 30, 26 to transmit torque and permit articulation therebetween. A cage 24 is provided to retain the balls 28 within the grooves 26, 30 in a known manner. The cage 24 is interposed between spherical surfaces 34, 35 on the outer and inner races, respectively. A retaining ring 18 is provided to axially retain the cage 24 within the open end of the outer race 14. The inner race 16 is likewise retained within the outer race 14 through the interaction between the inner race 16, the cage 24, and the retaining ring 18.

In a preferred embodiment, the retaining ring 18 limits the articulation of the inner race 16 by providing a stop to limit the travel of the balls 28. Likewise, the groove 30 in the outer race 14 extends for a distance axially within the outer race 14 to thus limit the travel of the balls 28 in the opposite axial direction.

Figure 2:
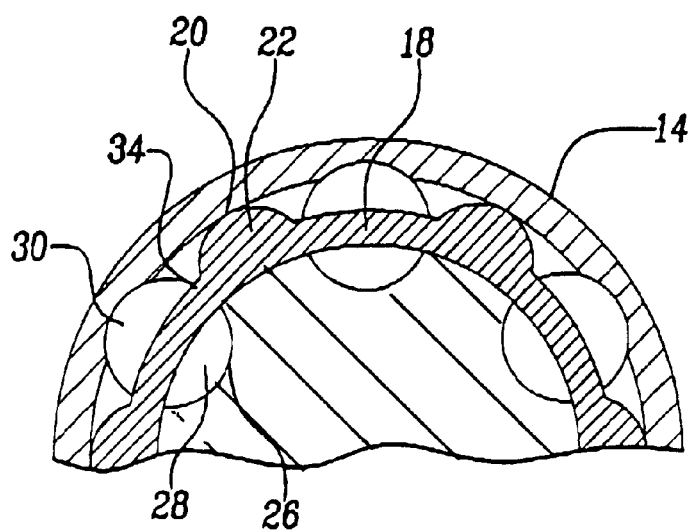
FIG. 2 is a cross sectional view of the constant velocity joint of FIG. 1 according to the present invention.
Figure 3:
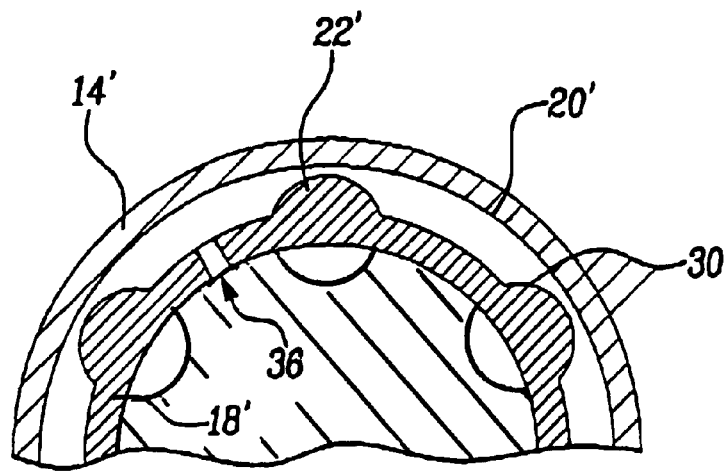
FIG. 3 is a view of a an alternative ring in an unrotated position during installation.

In a preferred embodiment, the constant velocity joint comprises a fixed joint, as illustrated in FIG. 1–3, having no substantial axial plunge. One skilled in the art could modify this design to use the ring 18 to provide an axial and articulation stop in a plunging constant velocity joint in a like manner.

As illustrated in FIG. 3, the retainer ring 18 is installed into the outer race 14 in an orientation so as to rotationally align the plurality of projections 22 provided on the circumference of the ring 18 with the ball race grooves 30 provided on the inner periphery of the outer race 14. The ring 18 is then inserted axially to align the projections 22 axially with the circumferential groove 20 provided on the inner periphery of the outer race 14. Once the ring 18 is so aligned axially, the ring 18 is rotated until the projections 22 are no longer rotationally aligned with the ball grooves 30, as illustrated in FIG. 2. Preferably, the projections 22 are spaced such that after assembly, the projections 22 are rotationally aligned between ball grooves 30, so the balls 28 may translate axially to a point beyond the groove 20 provided in the outer race, as illustrated in phantom in FIG. 1. In an alternative embodiment, the projections 22 may extend circumferentially within the outer grooves 30 so as to act as an axial stop for the balls 28.

Although shown as a one-piece integral part, one skilled in the art could easily devise a ring 18 having a separate retainer to serve the functions shown in the figures herein.

The groove 20, as illustrated in FIG. 2, has a radial depth less than the ball grooves 30 in the outer race 14. In an alternative embodiment, as illustrated in FIG. 3, a groove 20' has a radial depth greater than the ball grooves 30'. In FIG. 3, the projections 22' are shown in alignment with the ball grooves 30'. In this embodiment, a radial break 36 is provided in the ring 18' to permit radial compression of the ring 18' while it is being inserted into the outer race 14' within the grooves 30', as illustrated in FIG. 3. The ring 18' is axially aligned with the annular groove 20', then the ring 18' is rotated in a manner similar to that described with reference to FIG. 2.

In a preferred embodiment, after rotating the ring 18, as illustrated in FIG. 2, an operation is performed to rotationally retain the ring 18 with respect to the outer race 14. This can be done in any known manner, including a spot weld, as illustrated at 32 in FIG. 1. Alternatively, a staking operation could be performed to deform one or more of the race grooves 30 in the outer race to swage some material into the circumferential groove 20 to create an interference with the projection 22 to prevent rotation of the ring 18 in a known manner.

Figure 4:
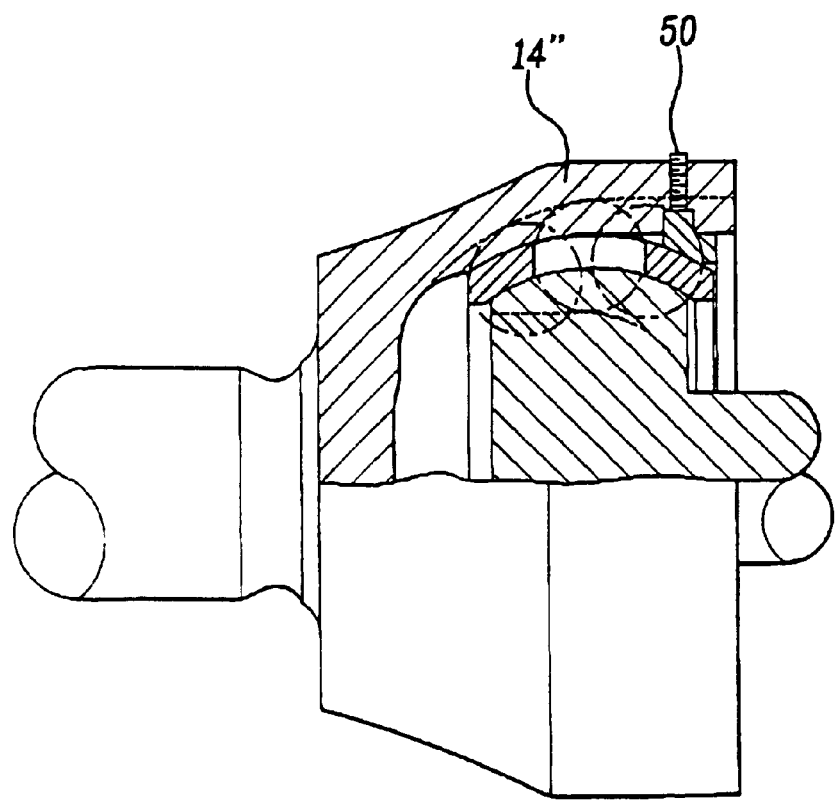
FIG. 4 is an embodiment of a retainer for retaining the ring.

An alternative embodiment includes a fastener secured through the outer race 14 to prevent rotation of the ring 18. One embodiment of this is illustrated in FIG. 4, wherein an Alan set screw 50 is threaded through the outer race 14 to engage the ring 18 as illustrated therein. Preferably the projection 22 has a flat at the outer circumference at this location to facilitate antirotation.

In an alternative embodiment, this radial screw 50 may be used to adjust the ring 18. In this alternative embodiment, a plurality of screws 50 are circumferentially spaced, and one tightens the screws to radially compress and thereby reducer the inside diameter of ring 18. Preferably the ring 18 includes a radial break 36 as illustrated in FIG. 3 to facilitate compression.

In a further alternative, the screw 50 is provided axially from the open end of the outer race 14 and engages the ring 18 to thereby prevent rotation. Likewise, a pin (not shown) could be inserted through a hole drilled axially through the outer race from the open end to engage a corresponding hole (not shown) in the ring 18.

Although preferred embodiments of the present invention have been described above, it will be apparent to a person skilled in the art that variations may be made to the system and method described herein without departing from the scope of the invention as defined by the following claims.

What is claimed is:

1. A retaining ring for maintaining a relative position of an inner joint to an outer joint in a constant velocity joint, comprising:

said outer joint having an open end, a generally spherical internal surface having a plurality of ball grooves formed therein, and an annular groove formed in the internal surface near the open end of the outer joint;

an annular ring having a radially extending tab, said tab being alignable within one of said ball grooves to axially align said tab with said annular groove, said annular ring thereafter being rotatable within said annular groove to align said tab between two of said ball grooves; and means for rotationally retaining said annular ring within said annular groove.

2. A retaining ring as claimed in claim 1, said ring further comprising a plurality of radially extending tabs corresponding with each of said ball grooves.

3. A retaining ring according to claim 2, said retaining ring further comprising an integrally formed one-piece member.

4. A retaining ring according to claim 3 wherein said rotational retaining means comprises a weld between said ring and said outer race.

5. A retaining ring according to claim 3, wherein said rotational retaining means comprises a swage within one of said ball grooves.

6. A retaining ring according to claim 3, wherein said rotational retaining means comprises a fastener threaded into said outer race to engage said ring to prevent rotation therebetween.

7. A retaining ring according to claim 6, further comprising a radial break in said annular ring.

8. A retaining ring according to claim 7, wherein said threaded fastener projects radially and compresses said ring to provide adjustment thereof.

* * * * *